US007138912B2

(12) United States Patent
Fitzgibbon et al.

(10) Patent No.: US 7,138,912 B2
(45) Date of Patent: Nov. 21, 2006

(54) MOVABLE BARRIER OPERATIONS METHOD AND APPARATUS

(75) Inventors: James J. Fitzgibbon, Batavia, IL (US); Andrew Gavel, Huntington Bay, NY (US); William Gioia, Winfield, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/393,442

(22) Filed: Mar. 20, 2003

(65) Prior Publication Data

US 2004/0183677 A1 Sep. 23, 2004

(51) Int. Cl.
*E06B 9/84* (2006.01)
*B66D 5/00* (2006.01)
*H02P 3/16* (2006.01)

(52) U.S. Cl. .............. 340/521; 340/539.27; 340/545.1; 340/577; 340/584; 340/590; 340/628; 340/528; 49/7; 160/7; 160/9; 292/92; 318/9; 318/269; 318/282

(58) Field of Classification Search ................ 340/521, 340/539.27, 545.1, 577, 584, 590, 628; 49/1, 49/7, 30; 160/7–9, 310; 292/92, 288; 180/271
See application file for complete search history.

(56) References Cited

U.S. PATENT DOCUMENTS 4,220,051 A 9/1980 Catlett
4,289,995 A * 9/1981 Sorber et al. .................. 318/9
4,338,526 A 7/1982 Martin et al.
4,697,383 A 10/1987 Hagiwara
4,785,293 A * 11/1988 Shearer et al. .............. 340/628
5,022,452 A 6/1991 Burrell
5,576,581 A * 11/1996 Iannuzzi et al. ............ 307/117
5,605,185 A 2/1997 McKeon
5,625,980 A * 5/1997 Teich et al. .................... 49/26

(Continued)

FOREIGN PATENT DOCUMENTS

DE 19637039 C1 * 11/1997

(Continued)

OTHER PUBLICATIONS

Derwent-Acc-No. 1997-527885: Ciliox V, Braking device for smoke protection curtain, garage door, fire protection curtain etc wound on electric motor powered roller—has electrical connection between roller brake and drive motor during unrolling process.*

*Primary Examiner*—Jeffery Hofsass
*Assistant Examiner*—Anne V. Lai
(74) *Attorney, Agent, or Firm*—Fitch, Even, Tabin & Flannery

(57) ABSTRACT

Movement of a movable barrier (10) such as, for example, a vertically-dropping fire door, can be controlled in an informed manner and with greater flexibility regarding the manner of movement via, in one embodiment, use of a motor (20) as a generator to resist the downward movement of the barrier. One or more dummy electrical loads (22) can be used in combination with the generator mode of operation to influence the degree of braking proffered by the motor. In various embodiments, one or more sensors (25, 26, 27) can be used to detect local and remote conditions of interest to thereby at least partially inform the barrier movement decision process. A display (90) (or displays) can serve to provide various kinds of information to authorized personnel and an operator control (120) can serve, at least under some operating circumstances, to permit a person to locally cause a closed barrier to move to at least a partially opened position.

63 Claims, 5 Drawing Sheets

U.S. PATENT DOCUMENTS

| | | | | |
|---|---|---|---|---|
| 5,675,487 | A | 10/1997 | Patterson et al. | |
| 5,712,546 | A * | 1/1998 | Holthouse et al. | 318/282 |
| 5,812,391 | A | 9/1998 | Mehalshick | |
| 5,839,766 | A | 11/1998 | Iannuzzi et al. | |
| 5,896,907 | A * | 4/1999 | Dever et al. | 160/6 |
| 5,903,216 | A | 5/1999 | Sutsos et al. | |
| 5,955,947 | A * | 9/1999 | Sutsos et al. | 340/5.21 |
| 6,082,433 | A * | 7/2000 | Vafaie et al. | 160/310 |
| 6,155,324 | A | 12/2000 | Elliott et al. | |
| 6,225,768 | B1 * | 5/2001 | Cookson et al. | 318/280 |
| 6,318,296 | B1 | 11/2001 | Nguyen | |
| 6,484,784 | B1 * | 11/2002 | Weik et al. | 160/7 |
| 2002/0170685 | A1 * | 11/2002 | Weik et al. | 160/133 |
| 2003/0146823 | A1 * | 8/2003 | Jansson | 340/286.02 |
| 2003/0213177 | A1 * | 11/2003 | Fitzgibbon et al. | 49/31 |

FOREIGN PATENT DOCUMENTS

| | | | |
|---|---|---|---|
| EP | 0559947 | A1 | 9/1993 |
| EP | 0688933 | A1 | 12/1995 |
| EP | 0959222 | A2 | 11/1999 |
| EP | 1504167 | A1 | 11/2003 |
| GB | 2399597 | A | 9/2004 |
| WO | WO 95/14323 | | 5/1995 |

* cited by examiner

MOVABLE BARRIER OPERATIONS METHOD AND APPARATUS

TECHNICAL FIELD

This invention relates generally to movable barriers and more particularly to the controlled or informed movement of such barriers.

BACKGROUND

Movable barriers of various kinds are known in the art including pivoting or sliding doors or gates, garage doors (comprising both segmented and one-piece panels), arm guards, rolling shutters, and vertically moving fire doors, to name a few. While such barriers share a variety of design constraints, goals, and requirements, fire doors present a particularly challenging design paradigm.

Fire doors are generally intended to obstruct significant building passageways (such as hallways or stairwell entrances) through which oxygen might otherwise flow to feed an existing undesired fire. Automatic operation, at least when closing, tends to be a desired and/or required design criteria. Though automatic closure capability comprises a long-standing and even a relatively intuitive need, past solutions often leave much to be desired.

Early solutions tended to emphasize mechanical solutions. For example, a vertically movable fire door would be suspended through use of a heat-sensitive fusable link. In theory the heat of a fire would melt the fusable link and permit the fire door to close and aid in denying oxygen to the fire. In practice such a response might still permit a fire to build and destroy a considerable amount of property and/or threaten individuals in the area, so long as the fire remained distal to the fusable link. Perhaps worse, such an approach makes testing or other maintenance requirements difficult, a circumstance that runs contrary to current knowledge regarding the likelihood that a given fire door of this type will often fail when needed if the fire door and its supporting linkages, tracks, and the like are not occasionally moved, exercised, and tested.

At least partially in response to dissatisfaction with such conditions, system designers began to integrate the operation of such fire doors with other building alarm systems. So configured, a fire door would be allowed to drop into a closed position in response to an electric actuation signal from, for example, a remote fire monitor system. At the same time, at least in part to permit ease of testing such systems, designers began incorporating motors that serve to lift a fire door back into a ready position after use.

Unfortunately, such alterations have not suitably addressed all concerns regarding the controlled and/or informed movement of such barriers. For example, for the most part, such barriers tend to be relatively heavy and are allowed to fall rapidly into place by the force of gravity. This rapid and often-unannounced movement has the potential to injure people in the path of the barrier's movement and/or can trap people without effective notice or opportunity to take any proactive measures to escape from the fire. One prior art suggestion suggests that pneumatic techniques be used to slow the descent of such a fire door. While this suggestion can aid in avoiding the problems just noted, it, too tends to again give rise to undesirable circumstances. As one simple example, there are times when a rapid descent is utterly appropriate and desired. Such a pneumatically controlled descent can be so slow as to permit a given fire to gain the advantage and defeat the intended result of the barrier closure.

There are other problems and concerns that are particularly keen when associated with fire doors. Centrally-architected alarm systems may or may not be able to effectively transmit useful control signals to various fire doors as located throughout a given building, with a likelihood of control failure being at least partly correlated to the size and behavior of a given fire, to some extent, the more devastating the conflagration the more likely a centrally-based control system will fail to effect closure of at least some fire doors.

Yet another problem can arise once a fire door has closed. That is, such a door can impede needed access by fire fighters. In general, however, it can be counterproductive to provide a simple and readily available mechanism to effect the opening of such a barrier because opening the barrier can, under some circumstances, be highly dangerous. Manipulation of such a control by unauthorized individuals or by fire fighters who are ignorant of conditions on the other side of the door can present considerable risk to local individuals and can also contribute to an unintended spreading of the fire.

BRIEF DESCRIPTION OF THE DRAWINGS

The above needs are at least partially met through provision of the movable barrier operations method and apparatus described in the following detailed description, particularly when studied in conjunction with the drawings, wherein.

Figure 1:
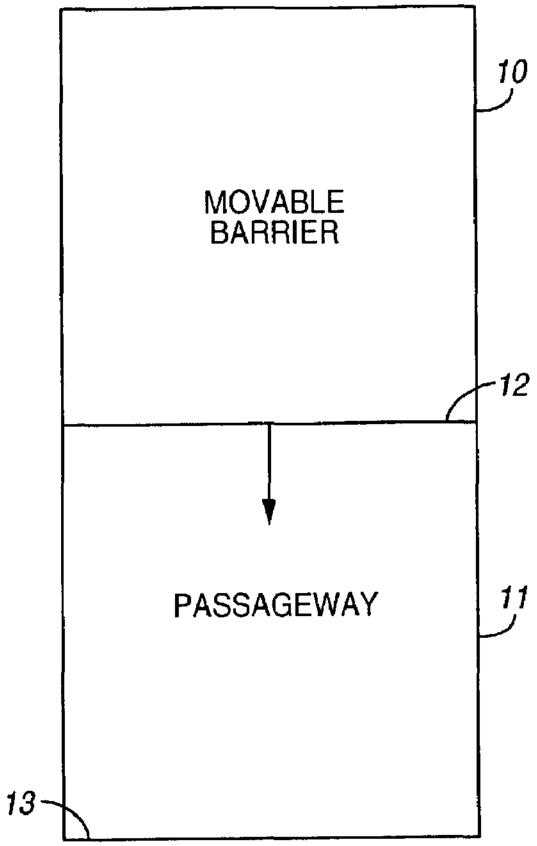
FIG. 1 comprises a front elevational schematic view of a moveable barrier and corresponding passageway as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, movement of a movable barrier (such as but not limited to a vertically-moving fire door), when moving towards either a closed position or towards an opened position, is controlled and/or appropriately informed to facilitate the avoidance of at least some of the problems that trouble prior art solutions. Pursuant to various embodiments, a movable barrier operator (such as a fire door operator) has a controlled-speed door lowering apparatus and capability and other automatic and/or human interface capabilities that complement and facilitate appropriately controlled closings and/or openings of the barrier.

In one embodiment, the controlled-speed door lowering apparatus comprises a motor, a movable barrier coupler that operably couples the motor to the movable barrier, and a mechanism that induces the motor to function as a generator to thereby resist in a controlled manner the movement (by gravity, for example) of the movable barrier towards a closed position. In one embodiment, the mechanism comprises a dummy electrical load that is selectively operably coupled to the motor to thereby utilize the motor's generator behavior. In a preferred embodiment, a plurality of dummy electrical loads (or a variable dummy electrical load) can be used to facilitate effectuation of a plurality of ways to operate the motor as a generator and, in particular, to provide a plurality of corresponding speeds by which the moveable barrier can be moved to the closed position. Depending upon the needs of a given application, the dummy electrical load (or loads) can be comprised of passive elements and/or active devices including Zener diodes.

So configured, motor control logic (comprising, in a preferred embodiment, motor control logic that is disposed proximal to the motor and the movable barrier rather than remotely therefrom) can be used to control the closure of the movable barrier and, in a preferred embodiment, can select from amongst the various dummy electrical load candidates to thereby select and effect a given rate of closure.

The motor control logic itself can respond to various stimuli including, if desired, control signals from, for example, a central alarm system. In addition, however, or in lieu of a centralized approach, the local system can respond to, for example, one or more sensors that provide information regarding conditions of interest or concern. Such a sensor or sensors can be disposed proximal to the movable barrier to provide information regarding local conditions and/or can be disposed distal to the movable barrier to provide information regarding more remote conditions. Such information can be used in various ways to better inform the controlled and selected movement of the movable barrier. In one embodiment, for example, movement selection criteria as applied when responding to the input from one sensor can be altered as a function of the input from a different sensor.

One or more displays can also be used as desired to provide information regarding various points of operational status and/or sensed conditions. Such a display can be used, for example, to provide information to a fire fighter regarding sensed conditions on the opposite side of a closed movable barrier. Such a display can also be used to display other information as well, including but not limited to maintenance and/or service information as corresponds to the controller or the movable barrier itself as well as legal notice information as is often applicable to movable barriers such as fire doors.

In addition, in a preferred embodiment, a lockable user operator-control interface can serve to permit authorized personnel to effect opening of a closed movable barrier under appropriate conditions. In one embodiment, the interface can comprise a keyed opening such that an individual, such as a fire fighter, can utilize a particular key to effect operation of the barrier-opening capability. In another embodiment, a radio receiver can be used to monitor for either a specific authorization signal or a general category of signal that is utilized to render the interface operable. One general category of signal could be, for example, a predetermined portion of a dispatch two-way wireless communications signal as used in a given area by, for example, a fire department.

These various attributes and approaches can be utilized in various combinations and configurations to permit provision of a flexible and responsive movable barrier operations platform that effects appropriate control of a movable barrier such as a fire door under a wide variety of operation conditions and circumstances.

Referring now to the drawings, and in particular to FIG. 1, a vertically-moving fire door 10 is depicted in the open position, wherein the barrier 10 is ordinarily secreted within a ceiling of a corresponding passageway 11 such that the bottom 12 of the barrier is more or less level with the ceiling. When closed, the bottom 12 of the barrier 10 descends to and typically contacts the floor 13 of the passageway 11. (It should be understood that the expression "passageway" as used herein is illustrative only and can encompass any appropriate space, including hallways, rooms, stairway or elevator entrances, and the like. It should also be understood that although a fire door is used herein to illustrate various embodiments and configurations, these teachings and embodiments are likewise applicable with other kinds of moving barriers as well and use of a fire door herein should be understood to serve as a helpful demonstrative model only.) For purposes of these described embodiments, it shall be presumed that the movable barrier 10 comprises a vertically moving fire door as is otherwise generally understood in the art.

Figure 2:
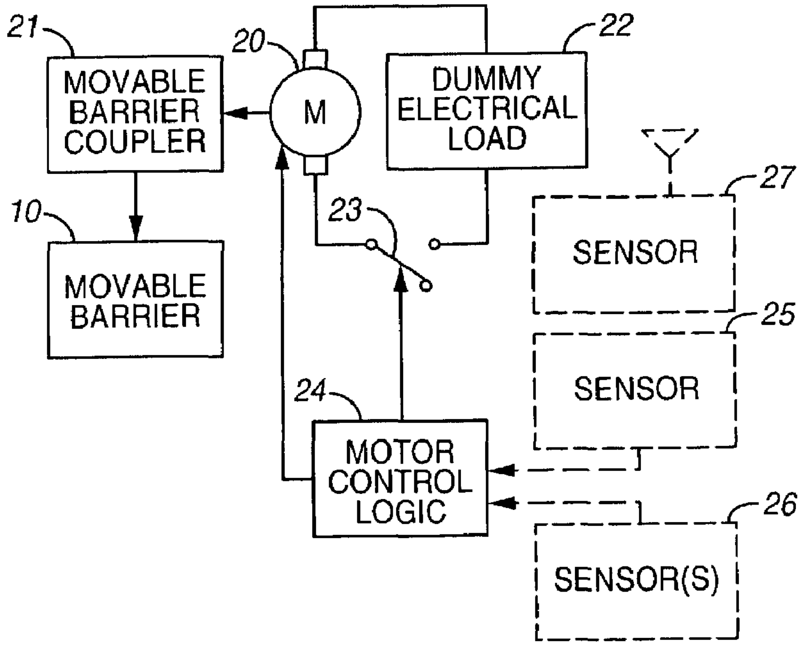
FIG. 2 comprises a block diagram as configured in accordance with various embodiments of the invention.

Referring now to FIG. 2, a movable barrier operator will preferably include a motor 20 (which may be either an AC or a DC motor as appropriate to a given application) that mechanically couples to the movable barrier 10 via a movable barrier coupler 21. The movable barrier coupler 21 can be any such coupling mechanism as is presently known or which is hereafter developed as one may wish to utilize.

In one embodiment, the motor 20 and the movable barrier coupler 21 preferably serve, in one mode of operation, to lift the movable barrier 10 from a lowered position to the raised position (as required, for example, following a testing of the fire door by local inspectors) in accordance with well understood prior art practice. Since such operation is already well understood, and since this mode of operation is also not especially key to an understanding of the various embodiments presented herein, no additional elaboration will be presented with respect to such capability for the sake of brevity and the preservation of focus.

Figure 3:
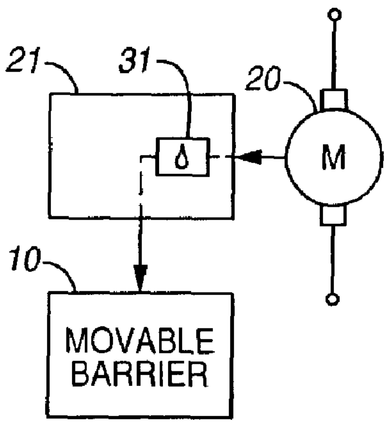
FIG. 3 comprises a detail block diagram as configured in accordance with an embodiment of the invention.

In many of the embodiments presented herein, the movable barrier operator moves the movable barrier 10 towards the lowered position in a controlled fashion and in response to a variety of stimuli or sensed conditions. As a fail-safe observance, however, and referring momentarily to FIG. 3, the movable barrier coupler 21 will preferably include a heat-responsive fusable link 31. So configured, if all else fails, the movable barrier 10 will still be caused to drop to the lowered position when enough heat from a proximal fire causes the fusable link 31 to become partially or fully melted and then severed due to the weight of the movable barrier 10.

Referring again to FIG. 2, in a preferred embodiment, the movable barrier 10 can be moved to a lowered position in a controlled fashion by using the motor 20 as a generator (when acting as a generator, of course, the motor 20 will physically resist, via the movable barrier coupler 21, downward movement of the movable barrier 10). Such resistance can either be constant or pulsed as desired by varying the generator load in a correspondingly constant or pulsed mode of operation. As will be shown below, the strength of the resistance provided by the motor 20 against downward movement of the movable barrier 20 can be varied by controlling in various ways the electrical loading on the motor 20 when acting as a generator.

A dummy electrical load 22 operably couples to the motor 20 (preferably via a switch 23 in order to permit convenient and controlled coupling of the former to the latter). As will be shown below, such a dummy electrical load 22 can be comprised wholly of passive elements or can also include active elements. In general, a dummy electrical load serves to absorb or soak up electrical energy (often generating heat in the process) and so it is here as well. So configured, when the movable barrier 10 begins to drop, it will cause a corresponding part of the motor 20 to turn via the movable barrier coupler 21. Such movement within the motor 20 will correspond to the movement of an electrical conductor within a magnetic field (or vice versa, depending upon the configuration of the motor) within the motor. This, in turn, will lead to the generation of electricity. The dummy electrical load 22 in turn will load the motor-acting-as-a-generator and hence induce a physical resistance within the motor that translates back through the movable barrier coupler 21 as a physical resistance to the downward motion of the movable barrier 10. This resistance, when properly controlled, is used herein to effect a controlled descent of the movable barrier 10.

Figure 4:
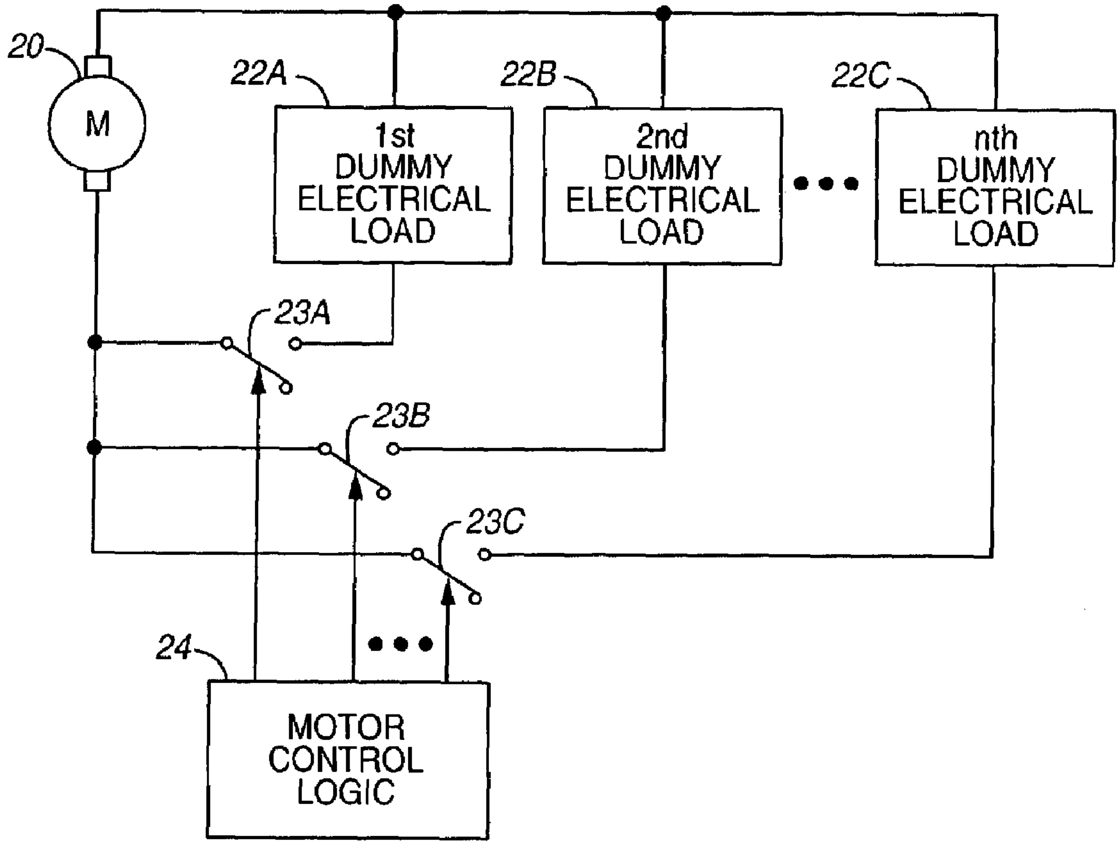
FIG. 4 comprises a detail block diagram as configured in accordance with another embodiment of the invention.

In a preferred embodiment, the movable barrier operator will have access to a plurality of selectable manners by which to load the motor 20 as a generator and hence a corresponding plurality of ways by which to control the movable barrier 10 during descent. One way of achieving this intent is to provide a plurality of dummy electrical loads as generally illustrated in FIG. 4. In this embodiment, a 1st dummy electrical load 22A presenting a first corresponding electrical load can be operably coupled to the motor 20 via a corresponding switch 23A in order to cause a first corresponding degree of resistance to the downward movement of the movable barrier 10 (again, as noted earlier, which degree of resistance can be used in a constant or in a non-constant mode of application to achieve varying speeds of descent). Similarly, a 2nd dummy electrical load 22B that presents a second corresponding electrical load (which may be more or less or equal to the electrical load presented by the 1st dummy electrical load 22A) can be operably coupled to the motor 20 via another switch 23B in order to cause a second corresponding degree of resistance to the downward movement of the movable barrier 10. And, as illustrated by the provision of an nth dummy electrical load 22C, any number of other dummy electrical loads can be similarly provided to accommodate whatever degree of flexibility and or resolution of control may be desired for a particular application. (It should also be noted that these various dummy electrical loads can also be used, if desired, in various parallel or series combinations to achieve yet even more effective loading values.)

Figure 5:
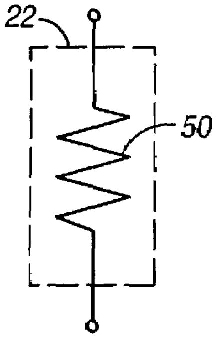
FIG. 5 comprises a detail schematic diagram as configured in accordance with an embodiment of the invention.

The dummy electrical loads themselves can be realized in a variety of ways. Pursuant to one approach, and referring now to FIG. 5, the load can be substantially passive through provision of an essentially passively resistive mechanism represented generically here by a resistor 50. There are various ways by which such a resistive load can be realized including use of actual resistive components, heating elements, lighting elements, and so forth. In general, for most applications, it is probably preferred that the dummy electrical load serve no purpose other than to present the desired level of electrical resistance to the motor 20. If desired, however, a circuit having other purposes (such as the illumination of a sign) could also be used or incorporated in common with such a load.

Figure 6:
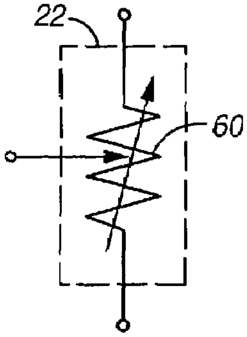
FIG. 6 comprises a detail schematic diagram as configured in accordance with an embodiment of the invention.

Referring now to FIG. 6, for some applications, it may also be possible to utilize a variable passive resistive mechanism 60. So configured, the movable barrier operator could selectively vary the resistance, and hence the load, on the motor 20 and hence select a corresponding braking effect on the downward-dropping fire door. It would also be possible, of course, to combine both variable and non-variable elements such as those depicted in FIGS. 5 and 6 in various parallel and/or series combinations to achieve various desired selectable loading amounts.

Figure 7:
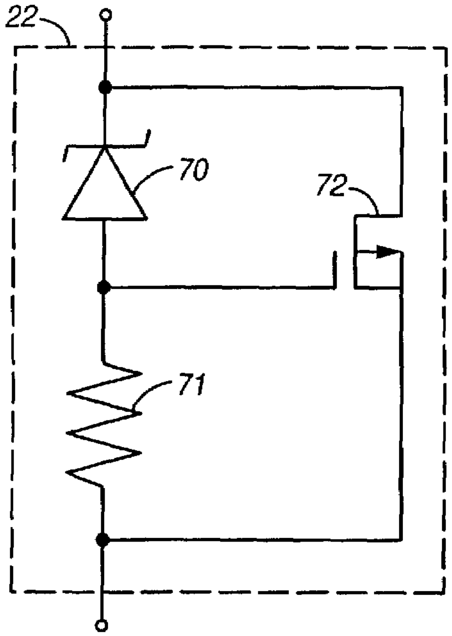
FIG. 7 comprises a detail schematic diagram as configured in accordance with an embodiment of the invention.

In other embodiments active elements can be utilized to realize the provision of an effective dummy electrical load. For example, and referring now to FIG. 7, a series-coupled Zener diode 70 (having an appropriately selected characteristic Zener voltage level) and resistor 71 can drive a field effect transistor 72 to effect a desired corresponding amount of electrical loading on the motor 20. In this configuration this circuit 22 attempts to hold the voltage across the generator constant. With a constant voltage across the generator, the door travels at a relatively constant speed. By changing the Zener voltage of Zener diode 70 the circuit can effectively affect the rate that the barrier falls. The circuit's power capability can be increased or decreased by the choice of the transistor 72. It would also be possible, of course, to provide both passive and active loads in a given configuration if desired.

Referring again to FIG. 2, so configured, a movable barrier operator can achieve a highly flexible degree of control over the manner by which a vertically-dropping fire door is lowered into a closed position. A single selected speed can be selected for use during the entire descent (with the speed being selected as appropriate to a given set of selection criteria). Or, various speeds can be used at different times during the descent. For example, the fire door can begin to drop quickly for a first portion of its travel, and then close more slowly during a remaining portion of the descent. Other examples are of course possible with these two examples serving only to underscore the significant degree of flexibility regarding control of the movable barrier one achieves through implementation of embodiments such as those describe above.

To effect such control, in a preferred embodiment the movable barrier operator includes motor control logic 24. Such logic 24 can comprise discrete or integrated circuitry but will preferably comprise a programmable platform (such as a microcontroller, microprocessor, or even an appropriate programmable gate array) to readily facilitate programming to effect the movable barrier control described herein. Such logic 24 can of course be remotely disposed with respect to the movable barrier operator itself, but is preferably contained therein. If desired, such logic 24 can respond to control signals as provided by, for example, a central alarm system, but in a preferred embodiment serves to receive and analyze information to thereby effect local movable barrier control as based upon such local analysis. Regardless of the stimulus source, in general, this motor control logic 24 serves, in this embodiment, as a dummy electrical load selector that can select at least one of the dummy electrical loads 22 to operably couple to the motor 20 to thereby control at least a manner of descent when the movable barrier moves from a raised to a lowered position.

In a preferred approach, such selections are based upon information locally analyzed by the motor control logic 24. To provide such information the motor control logic 24 can be operably coupled to at least one environmental condition sensor 25. Any number of different environmental conditions may be appropriate and/or desirable to so monitor in a given setting. A few example sensors 25 include, but are not limited to, smoke sensors, fire sensors, high air pressure event (i.e., blast) sensors, airflow sensors, temperature sensors, and oxygen sensors, to name a few. Such a sensor 25 can be disposed where most appropriate in a given setting to monitor the condition of interest.

If desired, of course, an additional sensor 26 (or sensors) can be used as well. Such additional sensor(s) 26 can be the same as, or different than, the first sensor 25. In addition, such additional sensor(s) 26 can be disposed proximal to the first sensor 25 (for example, to provide redundant sensing of particularly important conditions) or distal thereto as appropriate to a given application.

In general, such sensors 25 and 26 are likely operably coupled to the motor control logic 24 via an electrical conductor as well understood in the art. Other means of coupling (including, for example, optical conduits) are possible and may be more appropriate in a given setting. It is also possible that, for at least some sensors, a wireless coupling may be desired. For example, a sensor 27 that is most desirably disposed at a location that is considerably removed from the motor control logic 24 may be provided with a radio frequency capability that confers with a compatible capability provided at or otherwise supported by the motor control logic 24 in a fashion well understood in the art. Other forms of wireless communication are of course also possible. For example, where line-of-sight passage exists between the sensor 27 and the motor control logic 24 (or where suitable repeaters can be used to good effect) infrared-based communications can serve to provide sensor information to the motor control logic 24.

Figure 8:
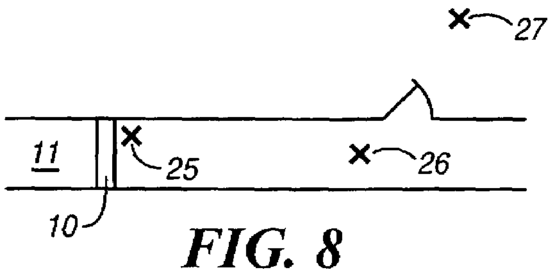
FIG. 8 comprises a top plan schematic diagram as configured in accordance with an embodiment of the invention.

As an illustrative example, and referring now to FIG. 8, a first sensor 25 (comprising, for example, a heat sensor) may be disposed proximal to a given movable barrier 10, a second sensor 26 (comprising, for example, an oxygen sensor) may be disposed distal to the movable barrier 10, and a third sensor 27 (comprising, for example, a smoke detector) may be disposed even further from the movable barrier 10 (for example, in a room that couples to the passageway 11) and may provide sensor information to the movable barrier operator via a wireless link owing to that location. So configured, the motor control logic 24 will receive information regarding various environmental conditions of interest at various location with respect to the movable barrier 10.

Figure 9:
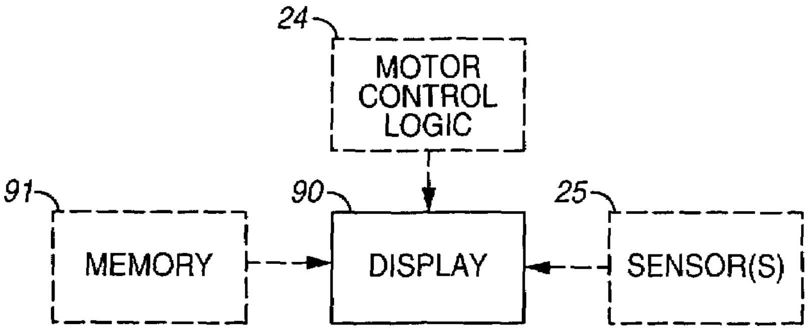
FIG. 9 comprises a detail block diagram as configured in accordance with another embodiment of the invention.

Depending upon the application and the operating needs of a given installation, it may be desirable to provide a mechanism by which an individual (such as a service person, a fire fighter, an inspector, or some other authorized and/or appropriately interested person) can view sensor information. With reference to FIG. 9, to meet such a need, a display 90 can be operably coupled to one or more of the sensors 25 as may be utilized in a given setting (depending upon the needs of a given installation, the sensor 25 may couple directly to the display 90 as suggested by the illustration of FIG. 9 or coupling may be provided through, for example, the motor control logic 24 or some other intermediary mechanism). This display 90, in a preferred embodiment, comprises an alphanumeric display. Any known or hereafter developed display technology can be used as desired and appropriate to a given application, including but not limited to liquid crystal displays, light emitting diode-based displays, cathode ray tubes, projection displays, plasma-based displays, and so forth. The display 90 can be located proximal or integral to the movable barrier operator or can be remotely located (for example, to position the display where it can be most conveniently viewed). The display 90 can also comprise a plurality of displays if desired (for example, a display may be provided on either side of the movable barrier 10). When a plurality of displays are utilized, it is also then possible to provide differing information on each display.

In addition to displaying information as reflects current sensor information (which information can be displayed for all sensors at once or in seriatim fashion using, for example, a scrolling marquee-style presentation technique) if may be appropriate or desired to display other information from the motor control logic 24 (such as operational status information and/or diagnostic codes or related information). To facilitate this the display 90 may also be operably coupled to the motor control logic 24 in accordance with well-understood prior art technique.

In a preferred approach, the display 90 also has access to a memory 91 (either directly as where the display 90 includes its own driver or via some other driver-capable intermediary). So configured, other information as stored in the memory 91 can be displayed, either pursuant to a predetermined display schedule and/or in response to specific user instructions. Some examples of useful stored information include but are not limited to historical sensor data, maintenance information (such as a history of service visits and results and/or a calendar of recommended upcoming service events), legal notice information (such as inspection information, requirements, and/or dates as may be otherwise required or recommended for display proximal to the movable barrier operator).

So configured, such a display can serve to support and encourage proper maintenance and servicing while also providing potentially helpful information regarding various monitored conditions prior to or during a fire. For example, a fire fighter that approaches the movable barrier when in a dropped position could utilize such a display to gain information regarding conditions on the other side of the movable barrier. Such information could be potentially helpful to such a person when making a decision regarding whether to move the barrier to an open position or to leave the barrier in place.

Figure 10:
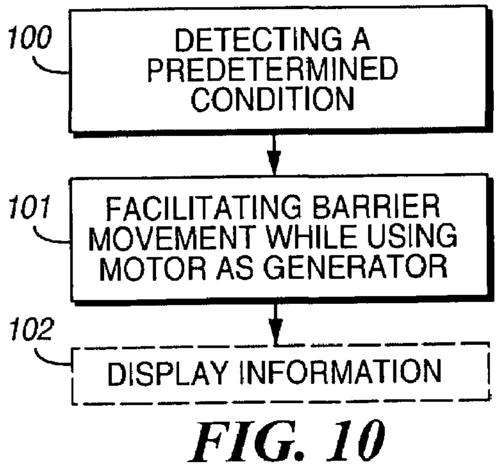
FIG. 10 comprises a general flow as configured in accordance with an embodiment of the invention.

The above-described embodiments permit considerable flexibility with respect to configuring a particular installation. In general, however, and referring now to FIG. 10, it can be seen that many of the described platforms can serve to detect 100 one or more predetermined conditions (such as, for example, when a sensed temperature, air pressure, indicia of fire, airflow, or atmospheric element) exceeds, for example, a corresponding predetermined threshold. The motor control logic 24 can then react by facilitating 101 movement of the movable barrier to a closed position in a given selected manner by using the motor 20 as a generator in a way that correlates to the selected manner of movement. As one illustrative example, when a fire is detected at a distal location to the movable barrier 10, the motor control logic 24 can select a relatively large dummy electrical load to thereby provide consider corresponding braking to significantly counteract the force of gravity that is otherwise urging the movable barrier towards a closed position. In this way, the movable barrier can be closed relatively slowly, thereby potentially providing, for example, an increased opportunity for persons in the vicinity of the movable barrier to avoid the barrier as it closes.

In an embodiment that includes the display 90, selected information can also be displayed 102. In the illustrative example above, for example, information regarding the instigating monitored condition can be displayed for the benefit those who may make good use of such information.

Figure 11:
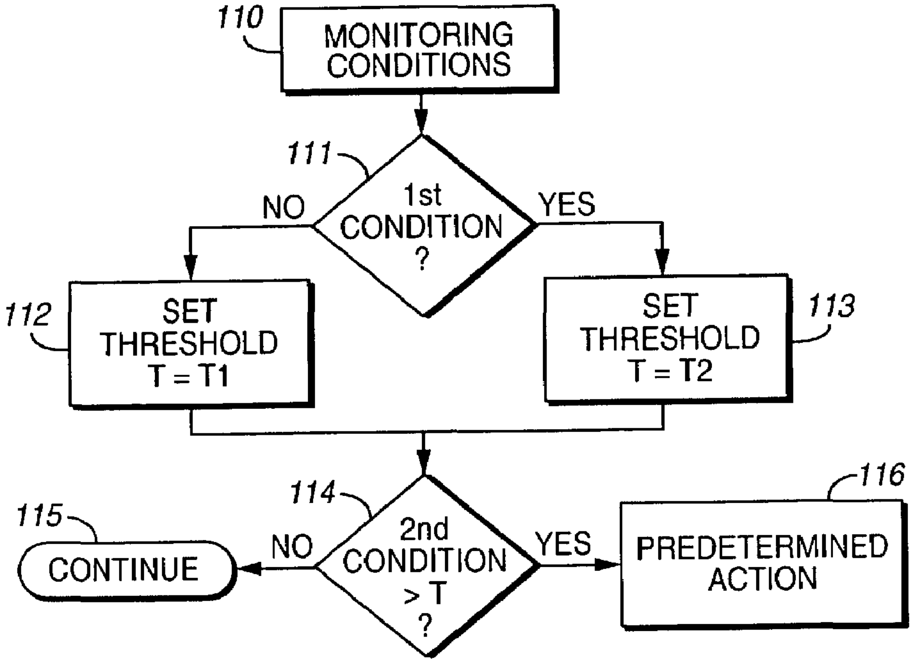
FIG. 11 comprises a flow diagram as configured in accordance with an embodiment of the invention.

The flexibility of the above embodiments permits other control strategies as well. For example, with reference to FIG. 11, a plurality of predetermined conditions can be monitored 110. For purposes of this illustration, two such conditions are monitored by two corresponding sensors. As part of this process, the platform determines whether a first monitored condition has occurred 111. If not true, a threshold T can be set 112 to a first predetermined value T1. If true, however, that threshold T can be set 113 to a different predetermined value T2. That threshold T is then used when considering 114 the second monitored condition. For example, the process can test whether the monitored condition exceeds the threshold T. When not true, the process can simply continue 115 with its ordinary programming. When true, however, a predetermined action (such as lowering the movable barrier in a particular predetermined way) can be effected 116.

As one simple example, the first condition can comprise a presence of atmospheric smoke particulate matter at a location that is distal to the movable barrier. When such a condition is sensed, there is an increased likelihood that a fire exists and that it may be appropriate to close the movable barrier. Because of this, the threshold T that is used for testing a local second sensor that monitors local temperature can be modified to render the second condition test more sensitive. For example, a lower threshold temperature T2 can be used such that the movable barrier operator will instigate a closing of the movable barrier at a lower sensed proximal temperature than would ordinarily be required to cause such a response.

In effect, it can be seen that these embodiments permit a first sensor input evaluation criteria to be varied as a function, at least in part, of sensor input from another sensor. Such a variance can be realized through alteration of a threshold as illustrated above or by any number of other approaches. For example, a plurality of candidate evaluation criteria can be provided, with a given evaluation criteria being selected as a function of a particular sensor value. As another example, the given evaluation criteria can be selected as a function of a plurality of sensor inputs (where, for example, different sensor inputs can be weighted differently (either in a static fashion or dynamically) to reflect their relative likely importance).

Figure 12:
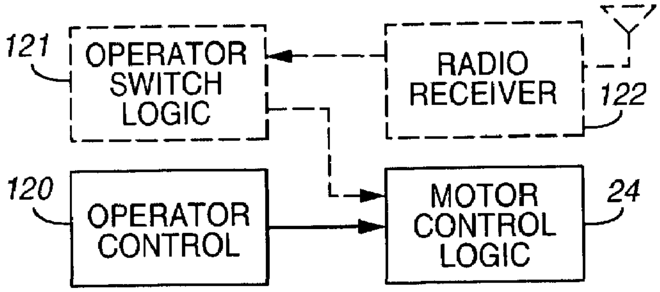
FIG. 12 comprises a detail block diagram as configured in accordance with yet another embodiment of the invention.

As noted earlier, it may be appropriate in some settings to provide a mechanism whereby an authorized individual can cause a closed fire door to be partially or fully re-opened. For example, it may be helpful to allow fire fighters access in this way to a passageway. With reference to FIG. 12, an operator control 120 can be operably coupled to the motor control logic 24 to thereby provide a mechanism whereby such an individual can so instruct and control the movable barrier. In order to prevent an inappropriate (and potentially dangerous) moving of the barrier by an unauthorized person, the operator control 120 can be, for example, a key-controlled operator switch. So configured, the authorized person must have the appropriate key to unlock and then utilize the operator control 120.

Figure 13:
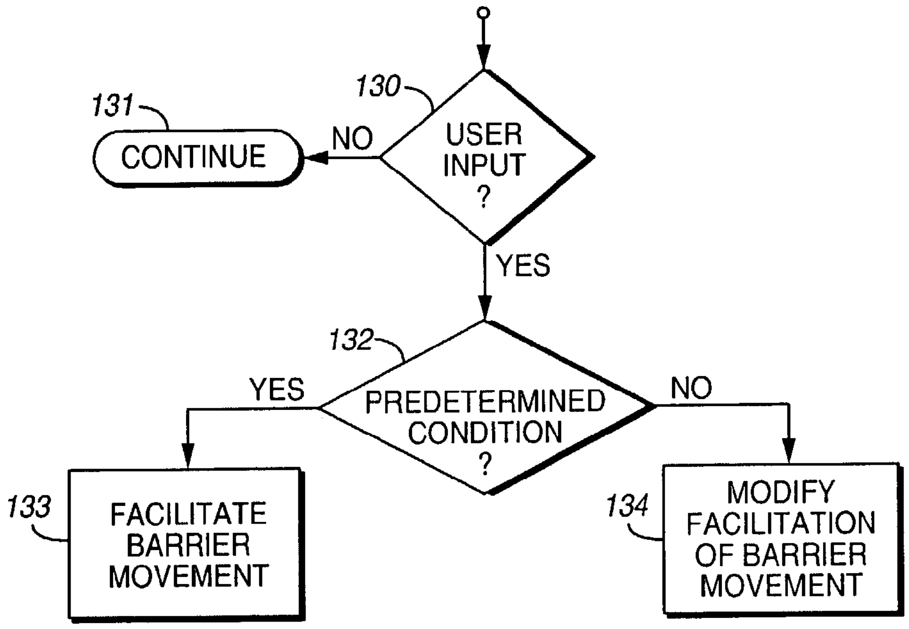
FIG. 13 comprises a detail flow diagram as configured in accordance with yet another embodiment of the invention.

In some settings, a key-controlled interface may be undesirable. Various other kinds of approaches can be used as an alternative (or in addition) to the use of a key. For example, operator switch logic 121 can optionally be provided to ascertain the presence and absence of one or more predetermined authentication indicia. With reference to FIG. 13, the operator switch logic 121 can monitor 130 for the presence of user input via the operator control 120. In the absence of input, the process can simply continue 131 in ordinary course. Upon detecting user input, however, the operator switch logic 121 then determines 132 whether a predetermined condition (or conditions as the case may be) is present or has occurred. In the absence of the predetermined condition, the logic 121 can deny or otherwise modify facilitation of the requested barrier movement. When the predetermined condition has occurred, however, the operator switch logic 121 can facilitate 133 the requested barrier movement and cause the movable barrier to open.

Such logic 121, for example, can couple to a keypad (not shown) or other data entry mechanism to facilitate the entry of one or more authorization codes. Upon receiving and determining a particular code as being a recognized authorization code, the operator switch logic 121 can then either facilitate operability of the operator control 120 itself or, in the alternative, forward signaling from the operator control 120 to the motor control logic 24.

In another embodiment, the operator switch logic 121 can operably couple (or itself include) a radio receiver 122. If desired, this radio receiver 122 can receive wireless signaling that comprises, again, one or more particular codes intended for recognition by the operator switch logic 121. In a preferred embodiment, however, the radio receiver 122 monitors one or more predetermined public safety dispatch communication system channels as are used by fire fighters in many municipalities. Since communications on such channels are often shared, it may be appropriate to monitor only the particular talk-groups that are assigned to and utilized by the appropriate user group (such as one or more fire response groups) (monitoring of a particular talk-group is usually effected by monitoring the control channel and/or other communications channel for a particular code as occupies a talk-group data field in the corresponding dispatch communication protocol as well understood in the art). Also, since such communications will likely occur as regards other venues that are unrelated to a particular movable barrier, it may be appropriate to significantly limit the receiver sensitivity of the radio receiver 122 such that only highly local communications will likely be properly received.

So configured, use of the operator control 120 to effect opening of a closed movable barrier can be rendered dependent upon the present or recent reception of radio communications that likely suggests the presence and activity of fire fighting personnel in the immediate vicinity. Such communications occur in the ordinary course of responding to a fire emergency and hence constitute a somewhat reliable indicator that authorized personnel are present. At the same time, this approach is relatively transparent to the user and would not require in many cases any particular additional actions on the part of the fire fighter who interacts with the operator control 120 when seeking to open the movable barrier.

Figure 14:
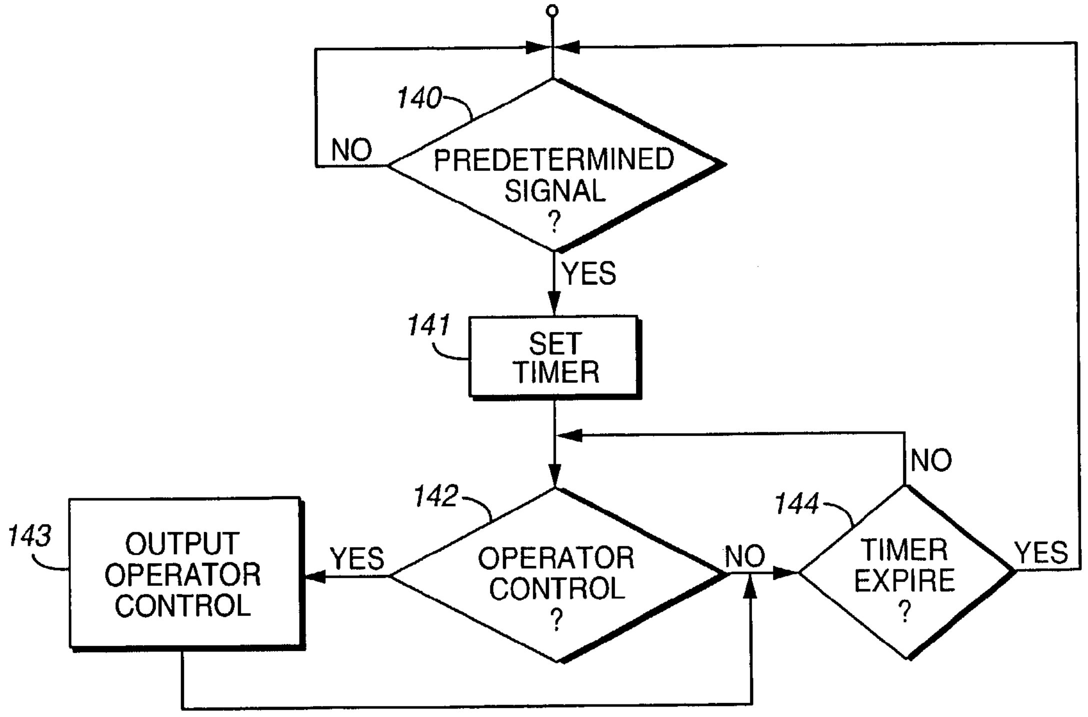
FIG. 14 comprises a detail flow diagram as configured in accordance with yet another embodiment of the invention.

In a preferred approach, the operator switch logic 121 will render the system responsive to the operator control 120 for some window of time following detection of such radio activity. With reference to FIG. 14, the logic 121 can monitor 140 for the presence and absence of the predetermined signal (such as the talk-group indicia of interest as described above). Upon detecting such a signal, the logic 121 can set 141 a timer for a predetermined window of time (such as, for example, 5 minutes). The logic 121 can then monitor 142 for the presence and absence of input via the operator control 120. Such monitoring 142 continues until either the timer expires 144 or the logic 121 senses operator input and provides a corresponding operator control output 143 as described above.

So configured, the operator switch logic 121 permits passage of input from the operator control only as occurs within a predetermined period of time of receiving the predetermined signal. The predetermined period of time can be varied as appropriate to a given application or with respect to other criteria, including for example the particular sensed condition or conditions that prompted the closure of the movable barrier.

Various embodiments have been set forth above that, individually or in various combinations with one another, serve to better facilitate the appropriate and informed control of a movable barrier and, in particular, a vertically-dropping fire door. Movement of the barrier can be controlled in various ways to accommodate a wider range of potentially desired and appropriate manners of movement. Also, information regarding various monitored and/or more static conditions can be ascertained to better inform such activity while also being made more available to authorized personnel. Such flexibility in turn can serve to better protect persons in proximity to the barrier as well as responding emergency personnel.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A movable barrier operator comprising:

a motor;

a dummy active electrical load operably coupled to the motor and comprising, at least in part, a plurality of selectively switched dummy active electrical loads;

a movable barrier coupler operably coupled to the motor;

the dummy active electrical load being configured and arranged to brake movement of a movable barrier when no power is applied to the motor.

2. The movable barrier operator of claim 1 wherein the movable barrier coupler includes a heat responsive fusable link that will breach the coupling between the movable barrier and the motor at temperatures exceeding a predetermined threshold for more than a predetermined period of time.

3. The movable barrier operator of claim 1 wherein the motor comprises an AC motor.

4. The movable barrier operator of claim 1 wherein the motor comprises a DC motor.

5. The movable barrier operator of claim 1 wherein the dummy active electrical load includes at least one Zener diode.

6. The movable barrier operator of claim 5 wherein the dummy active electrical load includes a plurality of Zener diodes.

7. The movable barrier operator of claim 6 wherein the dummy active electrical load comprises a plurality of selectively switched Zener diode circuits.

8. The movable barrier operator of claim 1 and further comprising motor control logic that is operably coupled to the motor.

9. The movable barrier operator of claim 8 wherein the motor control logic is further operably coupled to the dummy active electrical load.

10. The movable barrier operator of claim 1 and further comprising at least one passive dummy electrical load.

11. The movable barrier operator of claim 8 and further comprising at least one sensor, which at least one sensor is operably coupled to the motor control logic.

12. The movable barrier operator of claim 11 wherein the at least one sensor comprises at least one of:

a smoke sensor;

a fire sensor;

a high pressure event sensor;

an airflow sensor;

a temperature sensor;

an oxygen sensor.

13. The movable barrier operator of claim 11 wherein the at least one sensor comprises at least two sensors.

14. The movable barrier operator of claim 13 wherein the motor control logic includes control means for determining when to facilitate movement of the movable barrier towards a first position while also using the motor and the dummy active electrical load to partially resist movement of the movable barrier towards the first position.

15. The movable barrier operator of claim 14 wherein the control means is further for determining when to facilitate movement of the movable barrier towards a first position while also using the motor and the dummy active electrical load to partially resist movement of the movable barrier towards the first position as a function, at least in part, of the two sensors.

16. The movable barrier operator of claim 15 wherein when the control means determines to facilitate movement of the movable barrier towards a first position while also using the motor and the dummy active electrical load to partially resist movement of the movable barrier towards the first position, the control means selects from amongst a plurality of candidate movement speeds for the movable barrier.

17. The movable barrier operator of claim 16 wherein when the control means selects from amongst a plurality of candidate movement speeds for the movable barrier, the control means selects from amongst a plurality of candidate active dummy electrical loads.

18. The movable barrier operator of claim 13 wherein at least one of the two sensors is positioned substantially distal to the movable barrier.

19. The movable barrier operator of claim 18 wherein the sensor that is positioned substantially distal to the movable barrier is operably coupled to the motor control logic, at least in part, by a wireless communication link.

20. The movable barrier operator of claim 18 wherein at least one of the two sensors is positioned substantial proximal to the movable barrier.

21. The movable barrier operator of claim 11 and further comprising a sensor information display that is operably coupled to the at least one sensor.

22. The movable barrier operator of claim 21 wherein the sensor information display further comprises a maintenance information display.

23. The movable barrier operator of claim 21 wherein the sensor information display further comprises a legal notice display.

24. The movable barrier operator of claim 1 and further comprising an operator control that is operably coupled to the motor.

25. The movable barrier operator of claim 24 wherein the operator control includes a key-controlled operator switch.

26. The movable barrier operator of claim 24 and further comprising:

a radio receiver;

operator switch logic operably coupled to the operator switch, the radio receiver, and the motor.

27. The movable barrier operator of claim 26 wherein the operator switch logic includes control means for passing input from the operator control only when a predetermined signal has been received by the radio receiver.

28. The movable barrier operator of claim 27 wherein the predetermined signal comprises a predetermined talkgroup.

29. The movable barrier operator of claim 28 wherein the predetermined signal further comprises a predetermined talkgroup for a predetermined public safety dispatch communications system.

30. The movable barrier operator of claim 27 wherein the control means only permits passage of input from the operator control as occurs within a predetermined period of time of receiving the predetermined signal.

31. The movable barrier operator of claim 1 wherein the movable barrier coupler operable couples to a firedoor.

32. The movable barrier operator of claim 31 wherein the firedoor comprises a vertical-drop firedoor.

33. A method comprising:

detecting a first predetermined condition;

in response to detecting the first predetermined condition, facilitating unpowered movement of a movable barrier from a first position towards a second position while at least occasionally using a motor as a generator to resist the movement of the movable barrier towards the second position by using:

a plurality of selectively switched dummy active electrical loads.

34. The method of claim 33 wherein detecting a first predetermined condition includes detecting a temperature that exceeds a predetermined threshold.

35. The method of claim 33 wherein detecting a first predetermined condition includes detecting an atmospheric element in a concentration that exceeds a predetermined threshold.

36. The method of claim 33 wherein detecting a first predetermined condition includes detecting pressure that exceeds a predetermined threshold.

37. The method of claim 33 wherein detecting a first predetermined condition includes detecting fire.

38. The method of claim 33 wherein detecting a first predetermined condition includes detecting airflow that exceeds a predetermined threshold.

39. The method of claim 33 wherein detecting a first predetermined condition includes:

monitoring a plurality of conditions;

changing a threshold for analyzing the first predetermined condition as a function, at least in part, of another monitored condition.

40. The method of claim 39 wherein the first predetermined condition comprises a condition that occurs substantially proximal to the movable barrier.

41. The method of claim 40 wherein the another monitored condition comprises a condition that occurs substantially distal to the movable barrier.

42. The method of claim 40 wherein the another monitored condition comprises a condition that occurs substantially proximal to the movable barrier.

43. The method of claim 33 wherein facilitating unpowered movement of a movable barrier from a first position towards a second position while at least occasionally using a motor as a generator to resist the movement of the movable barrier towards the second position includes selecting a particular manner by which to facilitate unpowered movement of the movable barrier from amongst a plurality of candidate manners.

44. The method of claim 43 wherein selecting a particular manner by which to facilitate unpowered movement of the movable barrier from amongst a plurality of candidate manners includes identifying a particular dummy electric load from amongst the plurality of selectively switched dummy active electrical loads to operably couple to the motor.

45. The method of claim 44 wherein identifying a particular dummy electric load to operably couple to the motor includes identifying a particular dummy electric load that comprises a passive dummy electric load.

46. The method of claim 44 wherein identifying a particular dummy electric load further comprises identifying a particular selectively switched dummy active electrical load that includes at least one Zener diode.

47. The method of claim 43 wherein the plurality of candidate manners include various speeds by which to permit the movable barrier to move.

48. The method of claim 33 wherein facilitating movement of a movable barrier from a first position towards a second position includes using gravity to facilitate unpowered movement of the movable barrier from the first position to towards the second position.

49. The method of claim 33 and further comprising displaying information regarding the first predetermined condition.

50. The method of claim 49 and further comprising displaying information regarding at least one of:

maintenance information as pertains to the movable barrier; and legal notice information as pertains to the movable barrier.

51. The method of claim 33 and further comprising:

monitoring a user input that comprises an instruction to move the movable barrier towards the first position.

52. The method of claim 51 and further comprising:

prohibiting movement of the movable barrier towards the first position notwithstanding the instruction to move the movable barrier towards the first position when a predetermined condition exists.

53. The method of claim 52 wherein the predetermined condition comprises at least one of:

the first predetermined condition;

another predetermined condition.

54. The method of claim 52 wherein the predetermined condition comprises an absence of an appropriate key being placed in and appropriately manipulated in a keyed user input.

55. The method of claim 52 and further comprising:
monitoring for at least one predetermined wireless signal; and wherein the predetermined condition comprises an absence of the predetermined wireless signal.

56. A fire door operator for use with a vertical-drop fire door comprising:
a motor;
a fire door coupler operably coupled between a drive output of the motor and the fire door;
a plurality of dummy electrical loads that are operably coupleable to the motor comprising, at least in part, a plurality of selectively switched dummy active electrical loads;
at least one environmental condition sensor input;
a dummy electrical load selector being operably coupled to the at least one environmental condition sensor input and the plurality of dummy electric loads; such that the dummy electrical load selector can select at least one of the dummy electrical loads to operably couple to the motor in response to sensor input to thereby control at least a manner of descent when the fire door moves from a raised to a lowered position.

57. The fire door operator of claim 56 wherein the plurality of dummy electrical loads include at least one active dummy electrical load.

58. The fire door operator of claim 56 and further comprising a display that is operably coupled to the sensor input.

59. The fire door operator of claim 56 wherein the sensor input is operably coupled to a sensor that is disposed proximal to the fire door.

60. The fire door operator of claim 56 wherein the sensor input is operably coupled to a sensor that is disposed distal to the fire door.

61. The fire door operator of claim 56 and further comprising a user input that is operably coupled to the motor such that a user can instruct the motor to raise the fire door to a raised position.

62. The fire door operator of claim 61 wherein the user input comprises a conditional user input such that a predetermined condition must be met before the user input can instruct the motor to raise the fire door.

63. The fire door operator of claim 62 wherein the predetermined condition comprises one of:
a keyed lock being properly actuated; and
a predetermined wireless signal being received.

* * * * *

UNITED STATES PATENT AND TRADEMARK OFFICE

CERTIFICATE OF CORRECTION

PATENT NO. : 7,138,912 B2 
APPLICATION NO. : 10/393442
DATED : November 21, 2006
INVENTOR(S) : James J. Fitzgibbon et al.

It is certified that error appears in the above-identified patent and that said Letters Patent is hereby corrected as shown below:

*IN THE CLAIMS*

Column 13, Line 43; Change “using:” to -- using, --; and

Column 15, Line 17; Change “electric” to -- electrical --.

Signed and Sealed this

Twenty-seventh Day of March, 2007

JON W. DUDAS
*Director of the United States Patent and Trademark Office*